United States Patent
Dou et al.

(10) Patent No.: US 12,235,996 B2
(45) Date of Patent: Feb. 25, 2025

(54) SECURITY ARCHITECTURE SYSTEM, SECURITY MANAGEMENT METHOD, AND COMPUTING DEVICE

(71) Applicant: Phytium Technology Co., Ltd., Tianjin (CN)

(72) Inventors: Qiang Dou, Tianjin (CN); Yufeng Guo, Tianjin (CN); Yanzhao Feng, Tianjin (CN); Ming Zhang, Tianjin (CN); Zhuo Ma, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 279 days.

(21) Appl. No.: 17/993,428

(22) Filed: Nov. 23, 2022

(65) Prior Publication Data

US 2023/0161911 A1     May 25, 2023

(30) Foreign Application Priority Data

Nov. 24, 2021    (CN) .................. 202111398273.2

(51) Int. Cl.
| | |
|---|---|
| *G06F 21/57* | (2013.01) |
| *G06F 11/36* | (2006.01) |
| *G06F 21/53* | (2013.01) |
| *G06F 21/62* | (2013.01) |
| *G06F 21/71* | (2013.01) |

(52) U.S. Cl.
CPC .......... *G06F 21/6281* (2013.01); *G06F 21/53* (2013.01); *G06F 21/71* (2013.01)

(58) Field of Classification Search
None
See application file for complete search history.

(56) References Cited

U.S. PATENT DOCUMENTS

| | | | | |
|---|---|---|---|---|
| 2020/0234275 A1* | 7/2020 | Zhang | .................... | G06F 21/53 |
| 2022/0358240 A1* | 11/2022 | Neal | .................. | G06F 21/6245 |
| 2023/0094125 A1* | 3/2023 | Rogers | .................... | G06F 21/53 |
| | | | | 713/190 |
| 2023/0103518 A1* | 4/2023 | Rogers | .................... | G06F 21/53 |
| | | | | 726/26 |
| 2023/0342472 A1* | 10/2023 | Shao | .................... | G06F 21/575 |
| 2024/0143765 A1* | 5/2024 | Jungerman | ........... | H04L 9/3242 |

FOREIGN PATENT DOCUMENTS

| | | | | |
|---|---|---|---|---|
| CN | 110414235 A | | 11/2019 | |
| CN | 110768963 A | * | 2/2020 | ......... H04L 63/0428 |
| CN | 111310192 A | | 6/2020 | |
| CN | 112446029 A | * | 3/2021 | |

\* cited by examiner

*Primary Examiner* — Christopher B Robinson
(74) *Attorney, Agent, or Firm* — ANOVA LAW GROUP, PLLC

(57) ABSTRACT

A security architecture system includes a plurality of subsystems. The plurality of subsystems include a secure element subsystem. A first subsystem of the plurality of subsystems includes a trusted computing platform that has a trusted platform control module. The first subsystem is configured to, for a running object in one or more subsystems other than the first subsystem in the plurality of subsystems, use the trusted platform control module to perform security measurement on the running object based on a measurement strategy and a measurement benchmark value to obtain a measurement result. The measurement result is used to control a running state of the running object in one or more subsystems other than the first subsystem in the plurality of subsystems.

20 Claims, 6 Drawing Sheets

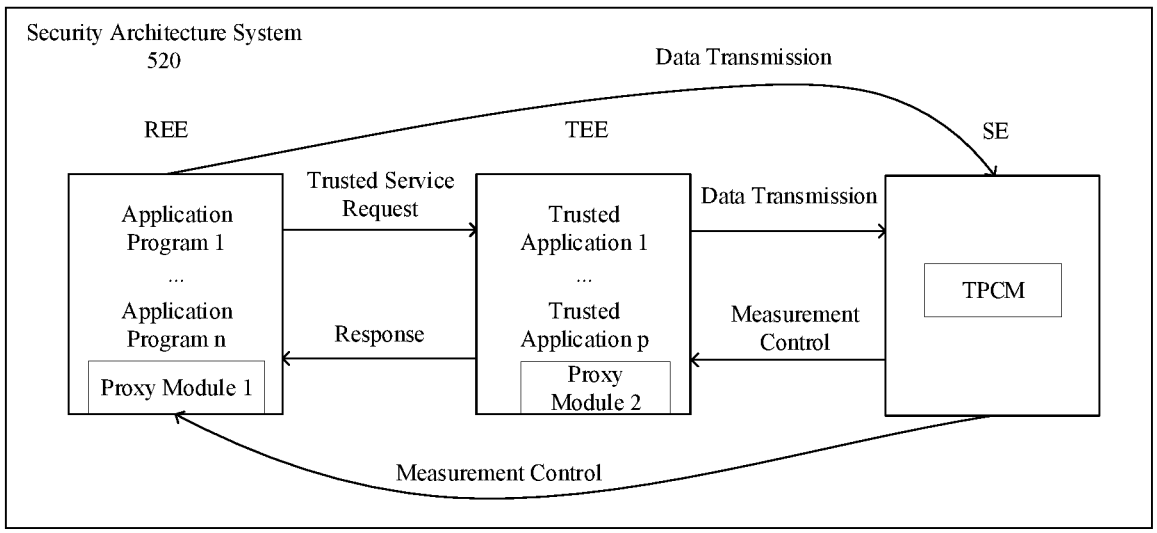
FIG. 5B
For the running objects in one or more subsystems other than the first subsystem in the plurality of subsystems, use the trusted computing platform to measure the security of the running objects based on a measurement strategy and a measurement benchmark value to obtain a measurement result — S601
600
FIG. 6
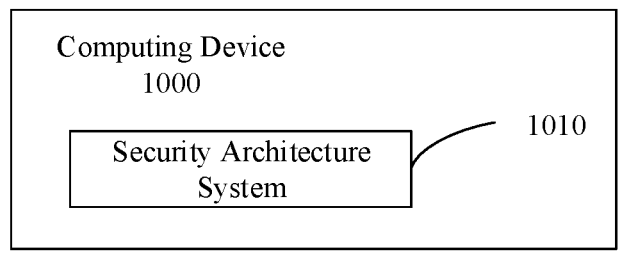
FIG. 7

SECURITY ARCHITECTURE SYSTEM, SECURITY MANAGEMENT METHOD, AND COMPUTING DEVICE

CROSS-REFERENCE TO RELATED APPLICATION

This application claims priority to Chinese Application No. 202111398273.2, filed on Nov. 24, 2021, the entire content of which is incorporated herein by reference.

TECHNICAL FIELD

The present disclosure is related to the technical field of processors and, more specifically, to a security architecture system, a security management method, and a computing device.

BACKGROUND

With the increasing security requirements, more and more security technologies are gradually applied to various computing devices. Security chip technology plays an important role in security architecture systems in computing devices. Generally, a security architecture system of a computing device includes a secure element (SE) subsystem, which is used to build a secure computing environment. In addition, trusted computing technology is gradually applied to various computing device. Therefore, there is a need to effectively implement the trusted computing technology in the security architecture system having the SE subsystem.

SUMMARY

In accordance with the disclosure, embodiments of this application provide a security architecture system. The security architecture system includes a plurality of subsystems. The plurality of subsystems includes a secure element (SE) subsystem. A first subsystem of the plurality of subsystems is constructed with a trusted computing platform. The trusted computing platform includes a trusted platform control module. The first subsystem is configured to, for a running object in one or more subsystems other than the first subsystem in the plurality of subsystems, use the trusted platform control module to perform security measurement on the running object based on a measurement strategy and a measurement benchmark value to obtain a measurement result. The measurement result is used to control a running state of the running object in the one or more subsystems other than the first subsystem in the plurality of subsystems.

Further in accordance with the disclosure, embodiments of this application provide a security management method suitable for a security architecture system. The security architecture system includes a plurality of subsystems. The plurality of subsystems includes a secure element (SE) subsystem. A first subsystem of the plurality of subsystems is constructed with a trusted computing platform. The trusted computing platform includes a trusted platform control module. The method includes: for a running object in one or more subsystems other than the first subsystem in the plurality of subsystems, using the trusted platform control module to perform security measurement on the running object based on a measurement strategy and a measurement benchmark value to obtain a measurement result. The method also includes: controlling, based on the measurement result, a running state of the running object in the one or more subsystems other than the first subsystem in the plurality of subsystems.

Further in accordance with the disclosure, embodiments of this application provide a computing device. The computing device includes a security architecture system. The security architecture system includes a plurality of subsystems, the plurality of subsystems including a secure element (SE) subsystem. A first subsystem of the plurality of subsystems is constructed with a trusted computing platform. The trusted computing platform includes a trusted platform control module. The first subsystem is configured to, for a running object in one or more subsystems other than the first subsystem in the plurality of subsystems, use the trusted platform control module to perform security measurement on the running object based on a measurement strategy and a measurement benchmark value to obtain a measurement result. The measurement result is used to control a running state of the running object in one or more subsystems other than the first subsystem in the plurality of subsystems.

BRIEF DESCRIPTION OF THE DRAWINGS

To clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts.

FIG. 5B is another schematic block diagram of the security architecture system according to some embodiments of the present disclosure.

FIG. 6 is a flowchart of a security management method according to some embodiments of the present disclosure.

FIG. 7 is a schematic block diagram of a computing device according to some embodiments of the present disclosure.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, the singular forms "a," "an," and "the" may be intended to include the plural forms as well, unless the context clearly indicates otherwise. Terms such as "first" and "second" used in the present disclosure do not indicate any sequence, quantity or importance, but they are just used to distinguish different components. Also, terms such as "include" and "comprise" mean that an element or an object appearing prior to the word covers an element or an object or its equivalent listed subsequent to the word, but does not exclude other elements or objects. Terms such as "connect" and "connected to" are not limited to physical or mechanical connection, but can comprise electrical connection, regardless of direct connection or indirect connection, such as by using various connected interfaces and lines to achieve information exchange.

With the increasing security requirements, more and more security technologies are gradually being applied to various computing devices. Security chip technology plays an important technical role in security architecture systems in computing devices, and the secure element subsystems implementing the security chip technology have become a key part of many security architecture systems. If the data security and stability of the computing system cannot be ensured, the computing environment will become fragile, and important resources, such as data associated with payments, can easily leak due to software attacks or physical attacks.

Generally, a security architecture system of a computing device may have three types of subsystems, namely a rich execution environment (REE) subsystem, a trusted execution environment (TEE) subsystem, and a secure element (SE) subsystem. The SE subsystem is used to implement the security chip technology to ensure the security of important resources.

Figure 1:
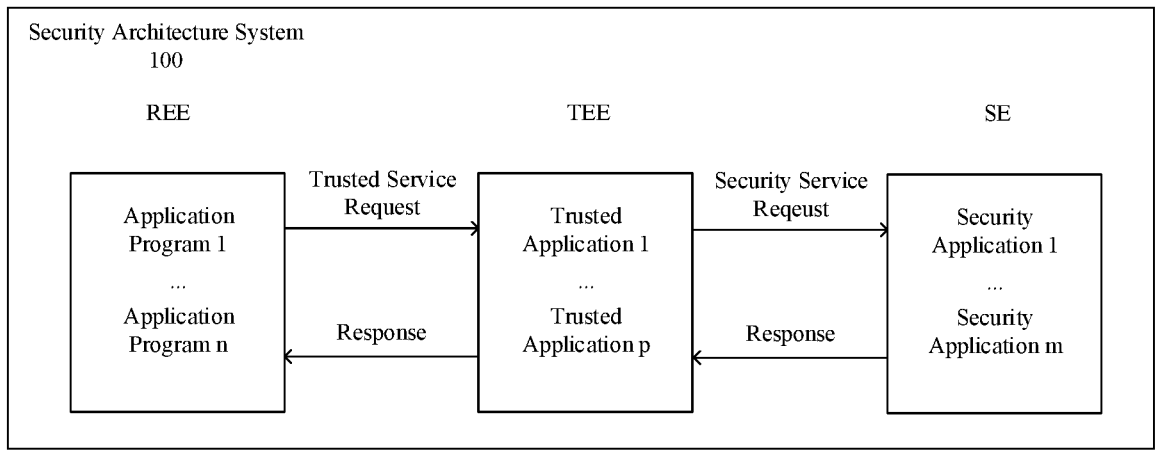
FIG. 1 is a schematic block diagram of a security architecture system in related art.

FIG. 1 is a schematic block diagram of a security architecture system in the related art. A security architecture system 100 shown in FIG. 1 may include a REE subsystem, a TEE subsystem, and a SE subsystem. The application running in the REE subsystem can be referred to as a client application (CA), which has low security and is vulnerable to attacks. The CA is shown as an application program in FIG. 1. The application running in the TEE subsystem can be referred to as a trusted application (TA), and its security is higher than the security of the REE. For example, a trusted application may be used to support functions such as verifying the payment environment in the payment process. The application running in the SE subsystem can be referred to as a secure element application (Applet), and its security is the highest among these three types of subsystems. Since the SE subsystem has the highest security compared to the REE subsystem and the TEE subsystem, the SE subsystem is generally used to store important resources, such as the root key and other information. The security of the important resources stored in the SE subsystem is ensured by means of authority verification and cryptography. In the security architecture system 100, the security of the computing environment can be ensured through the cooperation between these three types of subsystems.

Next, the security architecture system in the related art will be briefly described with reference to FIG. 1. As shown in FIG. 1, the REE subsystem may include a general operating system running on a general-purpose embedded processor, in which application programs, such as application program 1 to application program n shown in FIG. 1, where n is a positive integer, are installed. An application program may be a program involving payment scenarios, in which basic services such as browsing items, selecting items, submitting order, etc. are implemented. Although many security measures such as device access control, device data encryption mechanism, application runtime isolation mechanism, and permission verification-based access control are adopted in the REE, the security of important data in applications cannot be ensured.

The TEE subsystem may be an independent operating environment running outside the general operating system, which can provide trusted service to and be isolated from the REE subsystem. That is, the REE subsystem and the application programs thereon cannot directly access the hardware and software resources of the TEE subsystem. Trusted applications, such as trusted applications 1 to trusted application p shown in FIG. 2, where p is a positive integer, may be executed in the TEE subsystem to provide a trusted operating environment for the REE subsystem through the trusted applications, and ensure end-to-end security through the protection of confidentiality and integrity and the control of data access authority. In addition, the TEE subsystem may run in parallel with the REE subsystem and interact with the REE subsystem through a secure application programming interface (API). For example, the REE subsystem may send a trusted service request to the TEE subsystem to request the TEE subsystem to provide the corresponding trusted service and respond based on the request.

The TEE subsystem provides a more security operating environment than the REE subsystem, but the TEE subsystem cannot provide a secure key storage and key operating environment with hardware-level isolation. Generally, the TEE subsystem can provide many APIs for the REE subsystem, such that the REE subsystem can call the resources of the TEE subsystem. The more APIs the TEE subsystem provides for services, the greater the risk the TEE subsystem will face. It is difficult to ensure that the API itself does not have security risks, such as security vulnerabilities, which will lead to security risks in resources such as keys in the TEE subsystem. Further, a variety of TAs will run on the TEE subsystem, and the TAs are completely dependent on the isolation mechanism provided by the TEE subsystem operating system. Without hardware-level isolation, if the TA itself has security vulnerabilities or the TA itself actively accesses the keys or root keys corresponding to other TAs, it will also lead to a greater security risk for sensitive resources such as keys.

A trusted and secure resource storage and computing environment may also be established based on the SE subsystem. Generally, the software system in the SE subsystem is relatively simple, including fewer hardware components. Therefore, it is easy to establish physical protection and implement security measures, thereby improving the security strength of the SE subsystem to serve security systems with higher security requirements. In some embodiments, the security applications, such as security application 1 to security application m shown in FIG. 1, where m is a positive integer, can be implemented in the SE subsystem. For example, the TEE subsystem may send a security service request to the SE subsystem to request the TEE subsystem to provide the corresponding security service and respond based on the request. In some embodiments, the security service may be a service that requests the SE subsystem to perform cryptographic operations.

In some embodiments, there may be no physical path for the REE subsystem and the TEE subsystem to directly access the SE subsystem. The REE subsystem and the TEE subsystem may only make requests to the SE subsystem through interactive methods such as a shared memory, for the SE subsystem to provide services to the REE subsystem and the TEE subsystem. The SE subsystem may include an execution engine, a static random-access memory (SRAM), a non-volatile memory, and a key derivation function (KDF). In some embodiments, important resources such as the root key may be stored in the non-volatile memory within the SE subsystem to ensure the root key does not have a software of hardware path out of the SE subsystem through the SE subsystem's firmware or hardware. In addition, the KDF integrated in the SE subsystem may be implemented as software or hardware, and used to generate a derived key based on the root key. For example, the KDF may be a hash function, which is commonly used to turn short passwords into long passwords. Specifically, the shared memory described above may be referred to as a large-capacity memory that can be accessed by different processors in a multi-processor computer system.

However, the related art shown in FIG. 1 does not implement the trusted computing technology in the security architecture system including the secure element subsystem, lacks an active measurement process for the running objects in the subsystems, and cannot actively supervise the running objects and running processes in the system. This makes the security of the operating objects themselves unable to be ensured, and there is a risk of security attacks.

Based on this, some embodiments of the present disclosure provide a security architecture system, which includes the SE subsystem described above. For the security architecture system including the secure element subsystem, a trusted computing platform can be constructed based on one of the plurality of subsystems in the security architecture system. The trusted computing platform can be used to actively measure the security of some or all of the remaining subsystems, thereby improving the low computing security in related technologies. One of the plurality of subsystems described above may be the SE subsystem, or may be other subsystems in the plurality of subsystems of the security architecture system, for example, a trusted computing platform may be constructed based on the TEE subsystem, which will be described in conjunction with specific embodiments.

Figure 2:
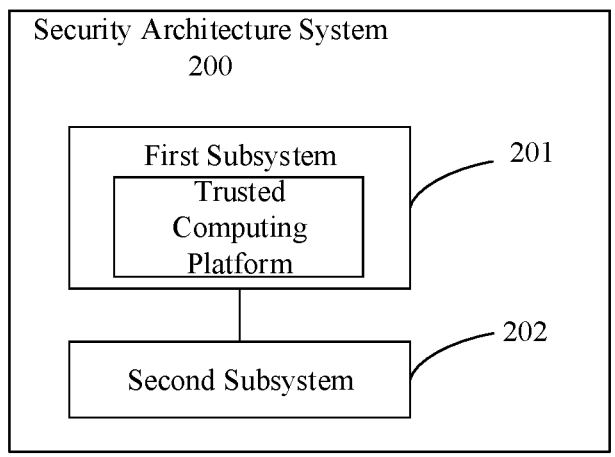
FIG. 2 is a schematic block diagram of the security architecture system according to some embodiments of the present disclosure.

FIG. 2 is a schematic block diagram of the security architecture system according to some embodiments of the present disclosure. As shown in FIG. 2, a trusted computing platform is arranged in a first subsystem 201 belonging to one of a plurality of subsystems in a security architecture system 200. The trusted computing platform may include a trusted platform control module (TPCM). For ease of description, the subsystems other than the first subsystem in the plurality of subsystems of the security architecture system may be collectively referred to as a second subsystem 202. The first subsystem 201 arranged with the trusted computing platform may be used to actively measure the security of running objects of one or more subsystems in the second subsystem 202, thereby ensuring the security of the running objects.

In some embodiments, the security architecture system may include the REE subsystem, the TEE subsystem, and the SE subsystem as shown in FIG. 1, and the TEE subsystem may be used as the first subsystem described above. That is, a trusted computing platform may be constructed in the TEE subsystem to measure the security of the REE subsystem. In other embodiments, the security architecture system may include the REE subsystem, the TEE subsystem, and the SE subsystem, and the SE subsystem may be used as the first subsystem described above. That is, the trusted computing platform may be constructed in the SE subsystem to perform security measurement on the running objects in the REE subsystem and/or the TEE subsystem.

According to some embodiments of the present disclosure, the first subsystem may be configured to, for running objects in one or more subsystems except the first subsystem in the plurality of subsystems, use the trusted computing platform to measure the security of the running objects based on a measurement strategy and a measurement benchmark value to obtain a measurement result. The first subsystem includes the trusted computing platform. The measurement result may be used to control the running state of the running objects in one or more subsystems except the first subsystem in the plurality of subsystems. The specific process of using the trusted computing platform to perform security measurement on the running objects based on the measurement strategy and the measurement benchmark value will be described in detail below.

In the security architecture system provided by the embodiments of the present disclosure, the first subsystem that includes the trusted computing platform can be used to actively perform security measurement on some or all of the remaining subsystems to ensure the security of running objects, thereby providing a safe and reliable computing environment and avoiding security risks such as leakage of important information. Compared with the security architecture system shown in FIG. 1, the trusted computing technology is further implemented, which can further improve the security of the computing environment on the basis of the protection of the security chip technology. Accordingly, the safety and reliability of the computing system are jointly improved by using the trusted computing technology and the security chip technology. This is beneficial to enable the computing device with the security architecture system to be used to implement application scenarios with higher security requirements, and the security business scope of the computing device is increased.

The security architecture system according to some embodiments of the present disclosure can be applied to application environments with high security requirements, for example, it can meet the security level requirements of application scenarios associated with traditional smart cards such as mobile payment, bank cards, bus cards, USD shields, etc. Therefore, the computing device including the security architecture system described above can provide users with services with higher security. It should be understood that, the security architecture system provided according to some embodiments of the present disclosure can also be applied to other application scenarios that require security management of data, which are not listed in the present disclosure.

Next, a computing device including the security architecture system according to some embodiments of the present disclosure will be described below.

The computing device may be a mobile terminal, a desktop computer, a tablet computer, a personal computer (PC), a personal digital assistant (PDA), a smart watch, a netbook, a wearable electronic device, an augmented reality (AR) device, etc. that can install applications and implement the corresponding application functions. The present disclosure does not limit the specific form of the computing device.

Figure 3A:
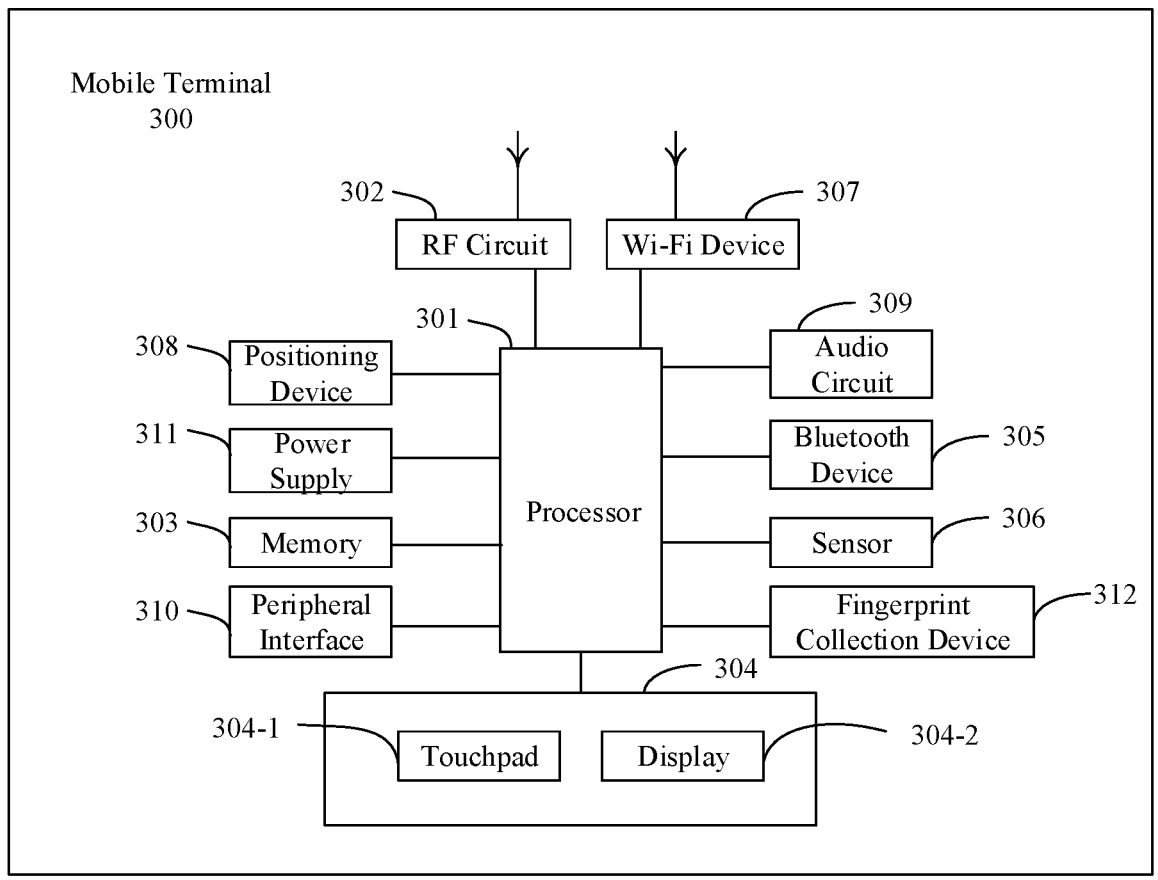
FIG. 3A is a schematic diagram of a terminal device that uses the security architecture system provided by some embodiments of the present disclosure.

In some embodiments, the security architecture system provided by the embodiments of the present disclosure may be implemented in a mobile terminal 300 as shown in FIG. 3A.

As shown in FIG. 3A, the mobile terminal 300 includes a processor 301, a radio frequency (RF) circuit 302, a memory 303, a touch display screen 304, a Bluetooth device 305, one or more sensors 306, a wireless fidelity (Wi-Fi) device 307, a positioning device 308, an audio circuit 309, a peripheral interface 310, and a power supply 311. These components may communicate vis one or more communication buses or signal lines. Those skilled in the art can understand that the hardware structure shown in FIG. 3A does not constitute a limitation on the mobile terminal. The mobile terminal 300 may include more or less components, combine some components, or arrange the components differently.

Each component of the mobile terminal 300 will be described in detail below with reference to FIG. 3A.

First, the processor 301 is the control center of the mobile terminal 300. The processor 301 may use various interfaces and lines to connect various parts of the mobile terminal 300. The processor 301 may be configured to execute various functions of the mobile terminal 300 and process data by running or executing the application programs stored in the memory 303 and calling the data stored in the memory 303. In some embodiments, the processor 301 may include one or more processing units. For example, the processor 301 may be various types of processor chips.

The RF circuit 302 may be used to receive and transmit wireless signals in the process of sending and receiving information or calling. In particular, the RF circuit 302 may receive the downlink data of the base station, send the data to the processor 301 processing, and send the data related to the uplink to the base station. Generally, the RF circuit may include, but is not limited to, antennas, at least one amplifier, transceivers, couplers, low noise amplifiers, duplexers, etc. In addition, the RF circuit 302 may also communicate with other devices through wireless communication. The wireless communication may use any communication standard or protocol, including but not limited to, global system for mobile communications, general packet radio service, code division multiple access, wideband code division multiple access, long term evolution, email, short message service, etc.

The memory 303 may be used to store application programs and related data. The processor 301 may be configured to perform various functions and data processing of the mobile terminal 300 by running the application programs and the data stored in the memory 303. The memory 303 may include a program storage area and a data storage area. The program storage area can store an operating system and an application program required for at least one function (e.g., an application program for implementing an online shopping function). The data storage area can store data (e.g., products browsing data, order data, etc.) created based on the user of the mobile terminal 300. In addition, the memory 303 may include a high-speed random-access memory (RAM), and may also include a non-volatile memory, such as a magnetic disk storage device, a flash memory device, or other volatile solid-state storage devices. The memory 303 may store various operating systems. The memory 303 may be independent and connected to the processor 301 through a communication bus. In addition, the memory 303 may also be integrated with the processor 301.

The touch display screen 304 may include a touchpad 304-1 and a display 304-2.

In some embodiments, the touchpad 304-1 may be configured to collect touch operations (which can also be referred to as touch events) on or near the user of the mobile terminal 300, and send the collected touch information to other devices (e.g., the processor 301). For example, the user may use any suitable object such as a finger, a stylus, etc. to perform an operation on or near the touchpad 304-1. A user's touch event near the touchpad 304-1 may be referred to as a hovering touch. The hovering touch may indicate that the user does not need to directly touch the touchpad 304-1 in order to select, move, or drag objects (e.g., icons), but the user only needs to be in the vicinity of the device in order to perform the desired function. In addition, various types of resistive, capacitive, infrared, and surface acoustic waves can be used to implement the touchpad 304-1.

The display (which can also be referred to as a display screen) 304-2 may be used to display information input by the user or information provided to the user, and various menus of the mobile terminal 300. The display 304-2 may be configured in the form of a liquid crystal display, an organic light-emitting diode, etc. The touchpad 304-1 may be overlaid on the display 304-2, and when the touchpad 304-1 detects a touch event on or near the touchpad 304-1, the detected event may be sent to the processor 301 to determine the parameters of the touch event. Subsequently, the processor 301 may provide the corresponding output data, for example, a product list, on the display 304-2 based on the parameters of the touch event. Although in FIG. 3A, the touchpad 304-1 and the display 304-2 are used as two independent components to realize the input and output function of the mobile terminal 300, but in some embodiments, the touchpad 304-1 may be integrated with the display 304-2 to realize the input and output functions of the mobile terminal 300. It should be understood that the touch display screen 304 is formed by stacking multiple layers of materials. Only the touch panel (layer) and the display screen (layer) are shown in FIG. 3A, and other layers are not described in FIG. 3A. In addition, the touchpad 304-1 may be arranged on the front of the mobile terminal 300 in the form of a full panel, and the display 304-2 may also be arranged on the front of the mobile terminal 300, such that a frameless structure can be realized on the front of the terminal device.

Further, the mobile terminal 300 may also include a fingerprint recognition function. For example, a fingerprint collection device 312 may be arranged on the back of the mobile terminal 300 (e.g., under the rear camera), or the fingerprint collection device 312 may be arranged on the front of the mobile terminal 300 (e.g., under the touch display screen 304). In another example, the fingerprint collection device 312 may be arranged in the touch display screen 304 to realize the fingerprint recognition function. That is, the fingerprint collection device 312 may be integrated with the touch display screen 304 to realize the fingerprint recognition function of the mobile terminal 300. In this case, the fingerprint collection device 312 may be arranged in the touch display screen 304, and may be a part of the touch display screen 304 or may be arranged in the touch display screen 304 in other ways. The main component of the fingerprint collection device 312 may be a fingerprint sensor, and the fingerprint sensor may adopt any type of sensing technology, including but not limited to optical, capacitive, piezoelectric, or ultrasonic sensing technologies.

The mobile terminal 300 may further include a Bluetooth device 305 for realizing data exchange between the mobile terminal 300 and other short-range devices (e.g., mobile phones, smart watches, etc.). More specifically, the Bluetooth device 305 may be an integrated circuit or a Bluetooth chip.

The mobile terminal 300 may also include at least one sensor 306, such as an optical sensor, a motion sensor, and other sensors. More specifically, the optical sensor may include an ambient light sensor and a proximity sensor. The ambient light sensor can adjust the brightness of the display of the touch display screen 304 based on the brightness of the ambient light, and the proximity sensor can turn off the power of the display when the mobile terminal 300 is moved to the ear. As a type of motion sensor, an accelerometer sensor can detect the magnitude of acceleration in all directions (generally three axes), detect the magnitude and direction of gravity when it is stationary, and can be used for applications that recognize the attitude of the mobile phone (e.g., horizontal and vertical screen switching, related games, magnetometer attitude calibration), and vibration recognition related functions (e.g., pedometer, tap), etc. The mobile terminal 300 may also be configured with other sensors such as a gyroscope, a barometer, a hygrometer, a thermometer, an infrared sensor, etc., which will not be described in detail here.

The Wi-Fi device 307 can be used to provide the mobile terminal 300 with network access following the Wi-Fi related standard protocol. The mobile terminal 300 may access the Wi-Fi access point through the Wi-Fi device 307, thereby assisting the user to receive and send data, such as sending and receiving emails, browsing the web, and accessing streaming media, etc., which provides the user with wireless broadband Internet access. In other embodiments, the Wi-Fi device 307 may also act as a Wi-Fi wireless access point, and may provide Wi-Fi network access for other devices.

The positioning device 308 may be used to provide the mobile terminal 300 with geographic location information. For example, the positioning device 308 may be a receiver of a positioning system, such as the global positioning system (GPS), the Beidou satellite navigation system, the Russian GLONASS, etc. After receiving the geographic location information sent by the position system, the positioning device 308 may, for example, send the information to the processor 301 for processing, or send the information to the memory 303 for storage.

In some embodiments, the positioning device 308 may also be a receiver of an assisted global positioning system (AGPS), and the AGPS may act as an auxiliary server to assist the position device 308 to complete ranging and positioning services. In this case, the assisted positioning server may provide positioning assistance by communicating with a device such as a positioning device 308 (e.g., a GPS receiver) of the mobile terminal 300 over a wireless communication network.

In some embodiments, the positioning device 308 may also be a positioning technology based on a Wi-Fi access point. Since each Wi-Fi access point has a globally unique media access control (MAC) address, when the Wi-Fi is turned on, the terminal device may scan and collect the broadcast signals of the surrounding Wi-Fi access points to obtain the MAC addresses broadcast by the Wi-Fi access points. The terminal device may send the data (e.g., the MAC addresses) that can identify the Wi-Fi access points to a location server through the wireless communication server. The location server may retrieve the geographic location of each Wi-Fi access point, and combine the strength of the Wi-Fi broadcast signal to calculate the geographic location of the terminal device and send it to the positioning device 308 of the terminal device.

The audio circuit 309 may be a speaker and a microphone for providing an audio interface between the user and the mobile terminal 300. On one hand, the audio circuit 309 may convert the received audio data into electrical signals, and transmit the electrical signals to the speaker to convert the electrical signals into sound signals for output. On the other hand, the microphone may convert the collected sound signals into electrical signals, which may be received by the audio circuit 309 to converted into audio data. The audio data may be output to the RF circuit 302 for transmission to, for example, another device, or to the memory 303 for further processing.

The peripheral interface 310 may be used to provide various interfaces for external input/output devices (e.g., keyboards, mouses, external displays, external memories, subscriber identification module cards, etc.). For example, a mouse can be connected through a universal serial bus (USB) interface, and a subscriber identification module (SIM) provided by a telecom provider can be through the metal contacts on the card slot of the SIM. The peripheral interface 310 may be used to couple the external input/output peripherals to the processor 301 and the memory 303.

The mobile terminal 300 may also include a power device 311 (such as a battery and a power management chip) for supplying power to various components. The battery may be logically connected to the processor 301 through the power management chip, such that the functions of charging and discharging management and power consumption management can be realized through the power supply 311.

Although not shown in FIG. 3A, the mobile terminal 300 may further include a camera (a front camera and/or a rear camera), a flash, a pico-projection device, a near field communication (NFC) device, etc., which will not be described in detail here.

The security architecture system described in each of the following embodiments can be implemented in the mobile terminal 300 having the hardware structure described above. Nonetheless, it can be understood that the security architecture system described herein can also be applied to other suitable computing devices, not limited to the mobile terminal described in conjunction with FIG. 3A.

Figure 3B:
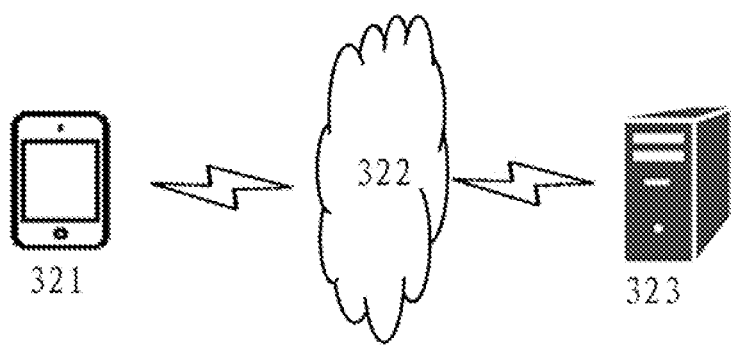
FIG. 3B is a schematic diagram of an application system according to some embodiments of the present disclosure.

FIG. 3B is a schematic diagram of an application system according to some embodiments of the present disclosure. As shown in FIG. 3B, the application system may include a terminal device 321, a network 322, and a server 323.

The terminal device 321 may be the illustrated mobile terminal or a fixed terminal, configured to perform data transmission with the server 323 through the network 322. The security architecture system according to some embodiments of the present disclosure may be arranged on the terminal device 321 (e.g., as shown in FIG. 2). In addition, various applications may also be installed on the terminal device 321, such as shopping applications, web browsing applications, video playback applications, news applications, etc. In addition, the terminal device 321 may include an input/output device, such that the terminal device 321 can receive user operations, such as receiving the user's touch and gesture operations through the touch display screen, or receiving the user's voice operation through a microphone. Then, the terminal device 321 may generate a request message based on the received operation. Through the network 322, the terminal device 321 may send the request message to the server 323, and receive the data returned by the server 323 in response to the request message. The terminal device 321 may display based on the data returned by the server 323, for example, display the received display data, such as a video or an image, on the display of the terminal device 321. Alternatively, the server 323 may also directly send the data to the terminal device 321 without receiving the request message, thereby performing a corresponding processing process on the terminal device 321.

The terminal device 321 may be various devices having a display and supporting program execution. As described above, the terminal device 321 may be the illustrated mobile terminal, such as the mobile terminal having the components described above in conjunction with FIG. 3A. As other examples, the terminal device 321 may also be a smart TV, a tablet computer, an e-book reader, a moving picture experts group audio layer IV (MP4) player, a laptop computer, a desktop computer, etc. In addition, the terminal device 321 may also implement the functions of each module in the form of software, which is not limited in the embodiments of the present disclosure.

The network 322 may be a wired network or a wireless network, which is not limited in the embodiments of the present disclosure. The server 323 may be a server that provides various services, such as receiving the data stream sent by the terminal device 321 and performing buffering. In addition, the server 323 may also receive the request message sent by the terminal device 321, analyze the request message, and send the analysis result (e.g., a data stream corresponding to the request message) to the terminal device 321. Different servers may be arranged based on different application types. For example, the server 323 may be an instant message server, a payment application server, an information display application server, a resource management server, etc. It should be understood that the numbers of terminal device 321, network 322, and server 323 shown in FIG. 3B are only illustrative. Based on the application scenarios, there can be any number of terminal devices, networks, and servers.

Hereinafter, the process of implementing the trusted computing technology and performing security measurement in the security architecture system according to some embodiments of the present disclosure will be described in detail below.

According to some embodiments of the present disclosure, the first subsystem may be a TEE subsystem. That is, the trusted computing platform may be constructed in the TEE subsystem.

Specifically, in terms of hardware implementation, the trusted computing platform may implement a trusted platform module (TPM). The TPM can be a chip implanted inside the computer to provide the computer with a root of trust. The chip's specification may be set by the trusted computing group. The trusted computing platform may include a trusted platform control module (TPCM) for implementing control functions related to trusted computing. In some embodiments, the TPCM may be implemented in the form of software.

According to some embodiments of the present disclosure, the trusted platform control module in the TEE subsystem may be constructed by running a trusted platform control module service layer on an operating system of the TEE subsystem, and running trusted software based on the trusted platform control module service layer. The trusted software can be used to implement the security measurement process. Accordingly, a trusted computing platform can be constructed in the TEE subsystem of the security architecture system to perform security measurements on some or all of other subsystems, which greatly improves the security and stability of the measured running objects, thereby providing a safe and reliable operating environment.

In some embodiments, in the case of constructing the trusted platform control module in the environment of the TEE subsystem, generally, the operating system of the TEE subsystem is run on the basis of the firmware program of the TEE subsystem. The trusted platform control module service layer is run on the basis of the operating system of the TEE subsystem. For example, the trusted platform control module service layer may implement functions such as identity authentication, state measurement, encrypted storage, trusted reporting, communication driving, task scheduling, and resource management.

A trusted software base (TSB) may run on the trusted platform control module service layer. The TSB may be used to implement the main business logic of the trusted platform control module, for example, to measure and control the running objects in the startup phase and runtime, and in the process of recoding measurement results, assessing trust status, generating trust logs, credentialing, and reporting. In the trusted computing system, the TSB plays a central role in the process.

For the embodiments where the first subsystem is the TEE subsystem, one or more of the subsystems described above other than the first subsystem may be the REE subsystem. That is, the TEE subsystem with the trusted computing platform may be used to measure the security of the running objects in the REE subsystem, and obtain the measurement results, thereby controlling the running state of the running objects in the REE subsystem based on the generated measurement results. For example, if the measurement results meet the expected requirements, the process of the running object can be continued, otherwise, the running object can be suspended or stopped.

According to some embodiments of the present disclosure, the trusted computing platform may also include a proxy module, which may be built in the REE subsystem as a measured object. The proxy module may be used to obtain information associated with the security metrics of the running objects in the REE subsystem, and provide the obtained information of the trusted platform control module in the TEE subsystem via a shared memory. Accordingly, the trusted platform control module can perform the security measurement process and generate measurement results based on the obtained information. In addition, the proxy module may also be used to control of the running state of the running objects. For example, in the case where the measurement result indicates the running object in the REE subsystem needs to be stopped, the control process of stopping the execution can be realized by the proxy module arranged in the REE subsystem.

According to some embodiments of the present disclosure, the proxy module may logically be a part of the trusted platform control module, but arranged on the side of the REE subsystem to capture data, perform data interaction with the trusted platform control module, and perform control operations. For example, in the case where the REE subsystem is the measured party, the proxy module may be located in the REE subsystem, but logically belong to the trusted platform control module. The proxy module may perform some tasks closely related to the REE subsystem on behalf of the trusted platform control module. Since these tasks are deeply embedded in the REE subsystem software, the trusted platform control module cannot or is inconvenient to directly execute the relevant processes from the outside. For example, tasks such as obtaining behavior-related information of the operating system in the REE subsystem, intercepting behaviors, and terminating processes are difficult to execute through the trusted platform control module from outside the REE subsystem. Therefore, these tasks can be realized by the proxy module arranged in the environment of the REE subsystem. For example, the proxy module may obtain the information associated with the to-be-measured running object in the REE subsystem and provide the obtained information to the trusted platform control module through the shared memory. Accordingly, the trusted platform control module can perform the corresponding measurement process and generate measurement results based on the obtained information. Since the proxy module itself is measured and secured by the trusted platform control module, these tasks performed by the proxy module are also trusted. In general, the main tasks of the proxy module include obtaining and controlling the system behavior, obtaining the system behavior and environment-related data, assisting in control execution, negotiating trusted connection, etc. of the REE subsystem, and establishing a trusted network environment based on node trust. In some embodiments, the proxy module may be a hook function set for the trusted platform control module to easily obtain the relevant information of the REE subsystem and to control the running objects of the REE subsystem accordingly.

Figure 4:
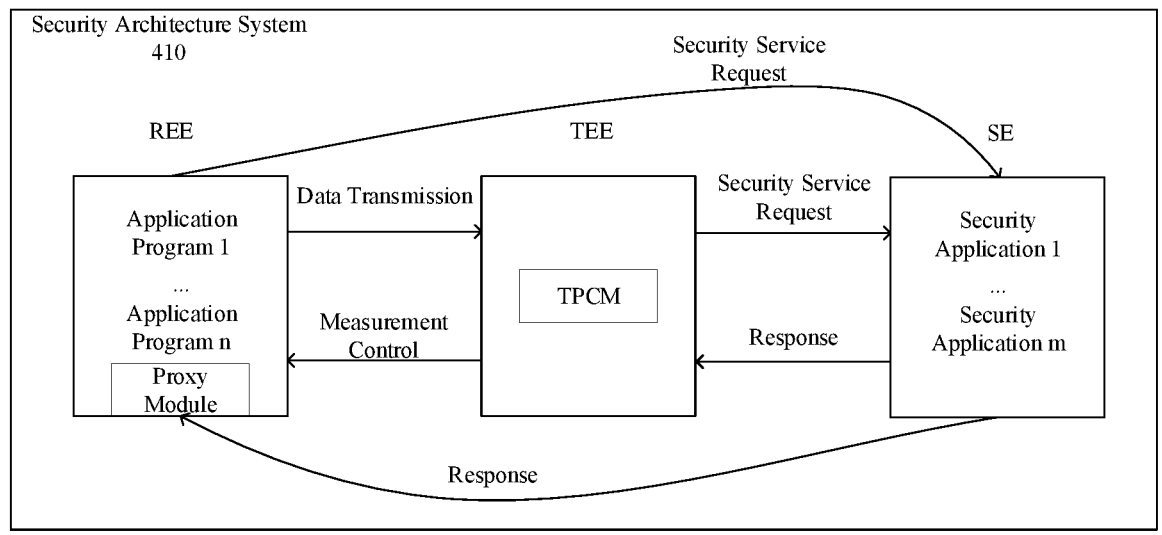
FIG. 4 is a schematic block diagram of the security architecture system according to some embodiments of the present disclosure.

FIG. 4 is a schematic block diagram of the security architecture system according to some embodiments of the present disclosure. In a security architecture system 410 shown in FIG. 4, the trusted computing platform is constructed in the TEE subsystem, and the trusted computing platform includes the trusted platform control module. In addition, the trusted platform control module may be configured to perform security measurement on the running objects in the REE subsystem. That is, the proxy module of the trusted computing platform may be arranged in the REE subsystem, and the proxy module may cooperate with the trusted platform control module to realize the complete process of trust measurement. It can be understood that, in the scenario shown in FIG. 4, the SE subsystem may be used to provide security services to the TEE subsystem or the REE subsystem, and its functions may be similar to the SE subsystem shown in FIG. 1. For example, the SE subsystem may obtain a security service request from the REE subsystem, and, based on the content of the request, provide the corresponding security services, such as providing authentication services associated with the root key stored in the SE subsystem, or services associated with cryptographic operations, etc., which will not be described here.

In the embodiment shown in FIG. 4, the trusted computing platform may be constructed based on the TEE subsystem. The trusted computing platform may include a trusted platform control module arranged in the TEE subsystem, and the trusted platform control module is implemented to measure the running objects in the REE subsystem. Accordingly, the proxy module of the trusted platform control module can be arranged in the REE subsystem being measured. Through the trusted platform control module and the proxy module, the active measurement process of the running objects in the REE subsystem can be realized, thereby improving the security of the processes (such as various applications) in the REE subsystem, avoiding the leakage of important resources due to a REE subsystem attack, and ensuring the security of core resources such as root keys. In some embodiments, the security measurement may generate a measurement result, such as generating a measurement report, etc., and the measurement result may be used to control the running state of the running objects in the REE subsystem. For example, when the measurement result indicates that one of the running objects in the REE is secure, the proxy module in the REE subsystem may enable the running object to continue execution. In another example, when the measurement result indicates that one of the running objects in the REE is unsecure, the proxy module in the REE subsystem may cause the running object to terminate the execution, thereby ensuring the security of the running object.

According to some embodiments of the present disclosure, the first subsystem may be a SE subsystem. That is, the trusted computing platform may be constructed in the SE subsystem. Specifically, the trusted platform control module in the SE subsystem may be constructed by running a trusted software base in the firmware of the SE subsystem. The trusted software base may be used to implement the security measurement process. Accordingly, the trusted computing platform is constructed in the SE subsystem of the security architecture system to perform security measurement on some or all of other subsystem, and the security and stability of the measured running objects can be greatly improved through the measurement, thereby providing a safe and reliable operating environment.

The above embodiment corresponds to the scenario where the SE subsystem is used as a measurer to measure other subsystems in the security architecture system, and the stability of processes in the REE subsystem and/or the TEE subsystem can be improved through the measurement, thereby ensuring the security of resources. To construct a trusted platform control module in the environment of the SE subsystem, compared with the TEE subsystem, since the core processor of the SE subsystem is generally used to implement simple processing, the trusted software base of the trusted platform control module can be run directly on the firmware program of the SE subsystem. Other logics can be similar to the trusted platform control module constructed in the environment of the TEE subsystem.

In some embodiments, for a scenario where the first subsystem is the SE subsystem, one or more subsystems other than the first subsystem in the plurality of subsystems may include the REE subsystem. That is, the SE subsystem constructed with the computing platform may be configured to measure the security of the running objects in the REE subsystem and obtain the measurement results, thereby controlling the running state of the running objects in the REE subsystem based on the generated measurement results. For example, if the measurement results meet the expected requirements, the process of the running object can be continued, otherwise, the running object can be suspended or stopped.

Figure 5A:
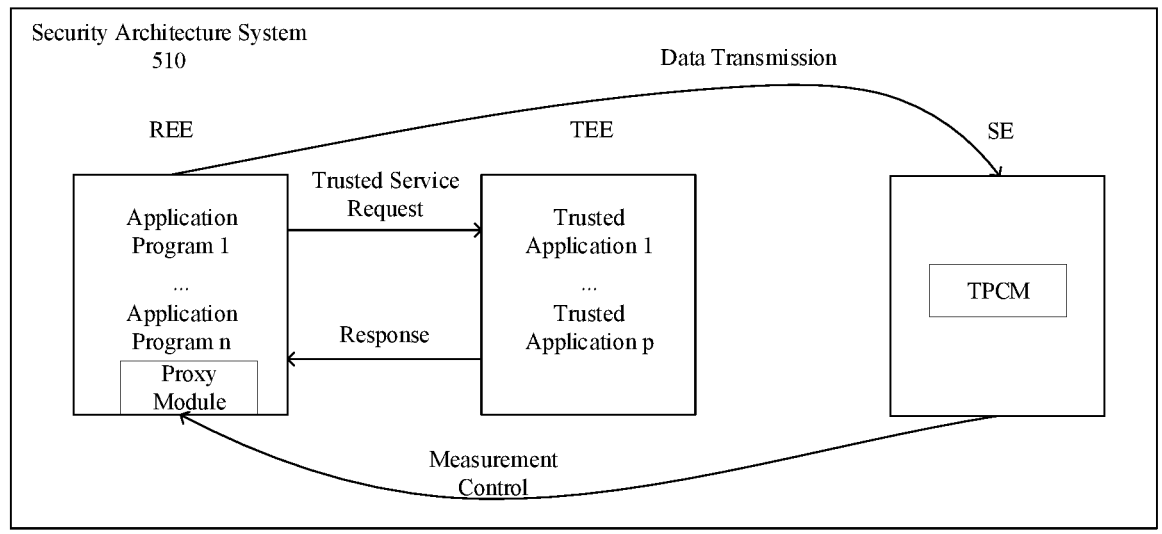
FIG. 5A is another schematic block diagram of the security architecture system according to some embodiments of the present disclosure.

FIG. 5A is a schematic block diagram of the security architecture system according to some embodiments of the present disclosure. In a security architecture system 510 shown in FIG. 5A, the trusted computing platform is constructed in the SE subsystem, and the trusted computing platform includes the trusted platform control module. In addition, the trusted platform control module may be configured to perform security measurement on the running objects in the REE subsystem. That is, a proxy module of the trusted computing platform may be arranged in the REE subsystem, and the proxy module may cooperate with the trusted platform control module to realize a complete trusted measurement process. It can be understood that the proxy module shown in FIG. 5A may be implemented as a structure similar to the proxy module described in conjunction with FIG. 4, such as the hook function for acquiring information and executing control described above. Similarly, in the following embodiment described in conjunction with FIG. 5B, for the description of the proxy module, reference can be made to the description of the proxy module in FIG. 4, which will not be repeated here. In addition, it can be understood that in the scenario shown in FIG. 5A, the TEE subsystem is used to provide the trusted service to the REE subsystem, and the functions it implements can be similar to the TEE subsystem shown in FIG. 1. For example, the TEE subsystem may obtain the trusted service request from the REE subsystem, and provide the corresponding trusted service based on the content of the request, such as supporting functions such as verifying payment environment in payment services.

In the embodiment shown in FIG. 5A, a trusted computing platform is constructed based on the SE subsystem, and the trusted computing platform includes the trusted platform control module arranged in the SE subsystem. Further, the trusted platform control module can be implemented to measure the running objects in the REE subsystem, such that the proxy module of the trusted platform control module can be arranged in the measured REE subsystem. Through the trusted platform control module and the proxy module, the active measurement process of the running objects in the REE subsystem can be realized, thereby improving the security of the processes (such as various applications) in the REE subsystem, avoiding the leakage of important resources due to a REE subsystem attack, and ensuring the security of core resources such as root keys. In some embodiments, the security measurement may generate a measurement result, such as generating a measurement report, etc., and the measurement result may be used to control the running state of the running objects in the REE subsystem. For example, when the measurement result indicates that one of the running objects in the REE is secure, the proxy module in the REE subsystem may enable the running object to continue execution. In another example, when the measurement result indicates that one of the running objects in the REE is unsecure, the proxy module in the REE subsystem may cause the running object to terminate the execution, thereby ensuring the security of the running object.

In some embodiments, for a scenario where the first subsystem is the SE subsystem, one or more subsystems other than the first subsystem in the plurality of subsystems may include the REE subsystem and the TEE subsystem. That is, the SE subsystem constructed with the computing platform may measure the security of the running objects in the REE subsystem and the TEE subsystem, and obtain the measurement results, thereby measuring and controlling the running state of the running objects in the REE subsystem and the TEE subsystem based on the generated measurement results. For ease of description, the running object in the REE subsystem can be represented as a first running object, and the running object in the TEE subsystem can be represented as a second running object.

In addition, the trusted computing platform arranged in the SE subsystem may also include a first proxy module constructed in the REE subsystem and a second proxy module constructed in the TEE subsystem. The first proxy module and the second proxy module may be respectively used to cooperate with the trusted platform control module to implement the security measurement for the REE subsystem and the TEE subsystem. According to some embodiments of the present disclosure, the first proxy module may be configured to obtain first information associated with the security measurement of the first running object, and provide the first information to the trusted platform control module through the shared memory. In addition, the first proxy module may also be configured to control the running state of the first running object. According to some embodiments of the present disclosure, the second proxy module may be constructed in the TEE subsystem. The second proxy module may be configured to obtain second information associated with the security measurement of the second running object, and provide the second information to the trusted platform control module through the shared memory. In addition, the second proxy module may also be configured to control the running state of the second running object.

Accordingly, the measurement subsystems can be the REE subsystem and the TEE subsystem, and the first proxy module and the second proxy module of the trusted platform control module can be respectively arranged in the REE subsystem and the TEE subsystem. The proxy modules and the trusted platform control module may cooperate with each other to jointly realize the process of security measurement, ensure the security of the running objects in the REE subsystem and the TEE subsystem, and provide a secure and reliable computing environment.

FIG. 5B is another schematic block diagram of the security architecture system according to some embodiments of the present disclosure. In a security architecture system 520 shown in FIG. 5B, similar to the situation shown in FIG. 5A, the trusted computing platform is constructed in the SE subsystem, and the trusted computing platform includes the trusted platform control module. The trusted platform control module may be configured to perform security measurements on the running objects in the REE subsystem, and may also be configured to perform security measurements on the running objects in the TEE subsystem. That is, compared to the embodiment in FIG. 5A in which the REE subsystem can be measured by the trusted platform control module in the SE subsystem, in the embodiment in FIG. 5B, the REE subsystem and the TEE subsystem can be measured by the trusted platform control module in the SE subsystem. Therefore, the first proxy module of the trusted computing platform may be arranged in the REE subsystem, and the first proxy module may cooperate with the trusted platform control module, thereby realizing a complete trust measurement process for the running objects in the REE subsystem. In addition, the second proxy module of the trusted computing platform may also be arranged in the TEE subsystem, and the second proxy module may cooperate with the trusted platform control module to realize a complete trust measurement process for the running objects in the TEE subsystem.

In the embodiment shown in FIG. 5B, a trusted computing platform is constructed based on the SE subsystem, and the trusted computing platform includes the trusted platform control module arranged in the SE subsystem. Further, the trusted platform control module can be implemented to measure the running objects in the REE subsystem and the TEE subsystem. Accordingly, the first proxy module of the trusted platform control module can be arranged in the measured REE subsystem, and the second proxy module of the trusted platform control module can be arranged in the measured TEE subsystem. Through the trusted platform control module, the first proxy module, and the second proxy module, the active measurement process of the running objects in the REE subsystem and the TEE subsystem can be realized, thereby improving the security of the processes in the REE subsystem, avoiding the leakage of important resources due to a REE subsystem or a TEE subsystem attack, and ensuring the security of core resources such as root keys. In some embodiments, the security measurement may generate a measurement result, such as generating a measurement report, etc., and the measurement result may be used to control the running state of the running objects in the REE subsystem and the TEE subsystem.

In the security architecture system described above in conjunction with FIG. 5B, the trusted platform control module in the SE subsystem can be used to actively measure the behavior of the processes in the REE subsystem and the TEE subsystem to ensure the security of the REE subsystem and the TEE subsystem. The TEE subsystem can be used to provide enriched trusted services for the REE subsystem. Compared with the SE subsystem of the security architecture system shown in FIG. 1, the SE subsystem in this embodiment only has the function of the trusted platform control module and does not need to provide any external security services, thereby reducing the probability of being attacked or cracked in terms of software and hardware. For example, the TEE subsystem in FIG. 5B may implement similar functions and services as the TEE subsystem shown in FIG. 1. In addition, in the process of implementing the corresponding functions and services of the TEE subsystem, the trusted platform control module in the SE subsystem may perform the security measurement on the running objects in the TEE subsystem to ensure the security of its running state.

According to some embodiments of the present disclosure, there may be a hardware isolation between first subsystem and the one or more subsystems other than the first subsystem in the plurality of subsystems. The access priority of the first subsystem may be higher than the access priority of the one or more subsystems other than the first subsystem in the plurality of subsystems.

For example, for a computing device arranged with a security architecture system, the CPU core, memory, and input and output (I/O) devices may be divided into mutually isolated measuring components and measured components. Accordingly, hardware isolation between the measuring party and the measured party is realized to reduce the risk of the measuring party being attacked. For example, in the case where the trusted computing platform is constructed in the SE subsystem to measure the REE subsystem and the TEE subsystem, the SE subsystem may be used as the measuring party, and the REE subsystem and the TEE subsystem may be used as the measured party, such that the hardware structure of the SE subsystem can be isolated from the hardware structure of other subsystems. In addition, since the access priority of the SE subsystem can be higher than the access priority of the REE subsystem and the TEE subsystem, the SE subsystem as the measuring party may obtain the information of the measured party through the proxy module, thereby obtaining the information associated with the security measurement to realize the security measurement process. Further, the measured party may not have access to the measuring party's resources. Therefore, through the hardware isolation and access priority arrangement described above, the security level of the component itself on which the trusted computing platform is constructed can be improved.

The implementation process of security measurement will be briefly described below.

The measurement strategy for security measurement may be implemented in the form of code, such as using a strategy language to define the functions it performs to improve the flexibility and adaptability of the measurement. For example, the strategy language may define the starting point, the measurement object, the measurement reference, and the implementation of measurement control. For example, the trusted platform control module may analyze the strategy language through an execution engine to realize the corresponding measurement process.

In some embodiments, after receiving the measurement request from the proxy module, the trusted platform control module may measure the running object requested by the measurement request. The proxy module may be arranged in the subsystem being measured. As described above, the proxy module may be logically a part of the trusted platform control module, but arranged in the subsystem being measured. Further, the proxy module may be configured to perform operations associated with the security measurement, such as capturing data, interacting with the trusted platform control module, and performing control operations. The proxy module is being arranged in the measured subsystem for the convenience of facilitating the above operations. As these operations are deep inside the software of the subsystem being measured, the trusted platform control module cannot or is inconvenient to directly perform the relevant processes from the outside. For example, it is difficult to perform tasks such as obtaining the behavior-related information of the operating system and terminating the process in the measured REE subsystem through the trusted platform control module from outside the REE subsystem. Therefore, these tasks can be realized by the proxy module arranged in the environment of the REE subsystem. Furthermore, since the proxy module itself is measured and secured by the trusted platform control module, these tasks performed by the proxy module are also trusted. In another example, under the condition that the running object meets a measurement duration condition, the trusted platform control module may be used to perform security measurement on the running object that meet the measurement duration condition. That is, the starting point of the security measurement process may be realized by a set measurement duration condition. In another example, the running object indicated by the measurement engine may be measured by the trusted platform control module. The present disclosure does not limit the implementation of initiating the security measurement process.

For the object being measured, the trusted platform control module may be used to measure the key data structure of the kernel in the measured subsystem, or to measure the program process in the measured subsystem, or to measure the kernel driver in the measured subsystem. In some embodiment, the object being measured may be a critical memory block. In addition, some services in the REE subsystem may also be combined with the security measurement, such as logging in, opening a certain file, executing a certain program, connecting to a certain network, using a certain device, etc., all of which may be used as measurement object.

In some embodiments, a measurement engine that matches the running object may be looked up in the trusted platform control module. Through the measurement engine matching the running object, the measurement operation matching the running object may be called in the trusted platform control module, thereby determining the measurement benchmark value of the running object. The measurement benchmark value may be used as a determination basis for determining whether the measured running object meets the security requirements.

The security architecture system provided by the embodiments of the present disclosure can realize real-time monitoring of key processes, modules, execution codes, data structure, important jump tables, etc., and measure and control the resource access behavior of the process by running the measurement strategy code in the trusted platform control module. Accordingly, the secure operation of the system is ensured, and the security mechanism is prevented from being bypassed or tampered with. Therefore, the trusted computing platform can monitor the important nodes of the system and effectively block the invasion of malicious code to the system.

In the security architecture system provided by the embodiments of the present disclosure, for the security architecture system including the secure element subsystem, the first subsystem arranged with the trusted computing platform can be used to actively measure the security of some or all of the remaining subsystems. Accordingly, the security of the running objects is ensured to provide a secure and reliable computing environment, and risks such as leakage of important information is avoided. In the security architecture system with the secure element subsystem, the trusted computing technology is further implemented, which can further improve the security of the computing environment on the basis of the protection of the security chip technology. Accordingly, the safety and reliability of the computing system are jointly improved by using the trusted computing technology and the security chip technology. This is beneficial to enable the computing device with the security architecture system to be used to implement application scenarios with higher security requirements, and the security business scope of the computing device is increased.

Another aspect of the present disclosure further provides a security management method suitable for a security architecture system. According to the embodiments of the present disclosure, the security architecture system may be the security architecture system described above in conjunction with FIG. 2. For a security architecture system including a secure element subsystem, a trusted computing platform may be constructed based on one of the plurality of subsystems in the security architecture system to perform security measurements on some or all of the remaining subsystems. By using the security management method according to some embodiments of the present disclosure, the security of the to-be-measured running objects can be ensured by performing active security measurement, thereby providing a secure and reliable computing environment and reducing the risk of leakage of important information.

According to some embodiments of the present disclosure, the security architecture system may include a plurality of subsystem. A first subsystem belonging to one of the plurality of subsystems may be constructed with a trusted computing platform. The trusted computing platform may include a trusted platform control module. FIG. 6 is a flowchart of a security management method 600 according to some embodiments of the present disclosure. As shown in FIG. 6, the security management method 600 includes: for the running objects in one or more subsystems except the first subsystem in the plurality of subsystems, using the trusted platform control module to measure the security of the running objects based on a measurement strategy and a measurement benchmark value to obtain a measurement result. The measurement result may be used to control the running state of the running objects in one or more subsystems other than the first subsystem in the plurality of subsystems. Accordingly, the security management method according to some embodiments of the present disclosure can construct a trusted computing platform based on one of the plurality of subsystems included in the security architecture system, and use the constructed trusted computing platform to perform security measurements on some or all of the remaining subsystems, thereby providing a secure and reliable operating environment.

According to some embodiments of the present disclosure, the first subsystem may be a TEE subsystem. The trusted platform control module in the TEE subsystem may be constructed by running a trusted platform control module service layer on an operating system of the TEE subsystem, and running trusted software based on the trusted platform control module service layer. The trusted software can be used to implement the security measurement process. Accordingly, a trusted computing platform can be constructed in the TEE subsystem of the security architecture system to perform security measurements on some or all of other subsystems, which greatly improves the security and stability of the measured running objects, thereby providing a safe and reliable operating environment.

According to some embodiments of the present disclosure, one or more of the plurality of subsystems other than the first subsystem may include a REE subsystem. The trusted computing platform may further include a proxy module, and the proxy module may be constructed in the REE subsystem. The proxy module may be configured to obtain the information associated with the security measurements of the running objects in the REE subsystem and provide the information to the trusted platform control module through a shared memory. Further, the proxy module may also be configured to control the running state of the running objects. In the above embodiment, the subsystem used for active measurement may be the TEE subsystem, and the trusted platform control module may be constructed in the TEE subsystem. Further, the subsystem being measured may be the REE subsystem, and the proxy module of the trusted computing platform may be arranged in the REE subsystem. The trusted platform control module and the proxy module may cooperate with each other to jointly realize the security measurement process for the REE subsystem, ensure the security of the running objects in the REE subsystem, and provide a secure and reliable computing environment. In general, the security of the REE subsystem in the security architecture system is lower than the security of the TEE subsystem and the SE subsystem, and most of the attacks come from the REE subsystem. By using the active security measurement process described above, the security of the running objects in the REE subsystem can be ensured, thereby improving the overall security of the security architecture system. The above embodiment corresponds to the solution described in conjunction with FIG. 4, which will not be repeated here.

According to some embodiments of the present disclosure, the first subsystem may be a SE subsystem, and the trusted platform control module in the SE subsystem may be constructed by running a trusted software base in the firmware of the SE subsystem. The trusted software base may be used to implement the security measurement process. Accordingly, the trusted computing platform is constructed in the SE subsystem of the security architecture system to perform security measurement on some or all of other subsystem, and the security and stability of the measured running objects can be greatly improved through the measurement, thereby providing a safe and reliable operating environment.

According to some embodiments of the present disclosure, one or more of the plurality of subsystems other than the first subsystem may include a REE subsystem. The trusted computing platform may further include a proxy module, and the proxy module may be constructed in the REE subsystem. The proxy module may be configured to obtain the information associated with the security measurements of the running objects in the REE subsystem and provide the information to the trusted platform control module through a shared memory. Further, the proxy module may also be configured to control the running state of the running objects. In the above embodiment, the subsystem used for active measurement may be the SE subsystem, and the trusted platform control module may be constructed in the SE subsystem. Further, the subsystem being measured may be the REE subsystem, and the proxy module of the trusted computing platform may be arranged in the REE subsystem. The trusted platform control module and the proxy module may cooperate with each other to jointly realize the security measurement process for the REE subsystem, ensure the security of the running objects in the REE subsystem, and provide a secure and reliable computing environment, thereby improving the overall security of the security architecture system. The above embodiment corresponds to the solution described in conjunction with FIG. 5A, which will not be repeated here.

According to some embodiments of the present disclosure, one or more subsystems other than the first subsystem in the plurality of subsystems may include a REE subsystem and a TEE subsystem. The running object in the REE subsystem may be represented as a first running object, and the running object in the TEE subsystem may be represented as a second running object. The trusted computing platform may further include a first proxy module and a second proxy module. The first proxy module may be constructed in the REE subsystem. The first proxy module may be configured to obtain first information associated with the security measurement of the first running object, and provide the first information to the trusted platform control module through the shared memory. In addition, the first proxy module may also be configured to control the running state of the first running object. The second proxy module may be constructed in the TEE subsystem. The second proxy module may be configured to obtain second information associated with the security measurement of the second running object, and provide the second information to the trusted platform control module through the shared memory. In addition, the second proxy module may also be configured to control the running state of the second running object.

In the above embodiment, the subsystem used for active measurement may be the SE subsystem, and the trusted platform control module may be constructed in the SE subsystem. The subsystems being measured may be the REE subsystem and the TEE subsystem, and the first proxy module and the second proxy module of the trusted computing platform may be respectively arranged in the REE subsystem and the TEE subsystem. The first proxy module and the second proxy module may cooperate with the trusted platform control module to jointly realize the security measurement process, ensure the security of the running objects in the REE subsystem and the TEE subsystem, and provide a secure and reliable computing environment. That is, in this embodiment, the trusted platform control module in the SE subsystem may separately measure the security of the running objects of both the REE subsystem and the TEE subsystem. The above embodiment corresponds to the solution described in conjunction with FIG. 5B, which will not be repeated here.

According to some embodiments of the present disclosure, there may be a hardware isolation between first subsystem and the one or more subsystems other than the first subsystem in the plurality of subsystems. The access priority of the first subsystem may be higher than the access priority of the one or more subsystems other than the first subsystem in the plurality of subsystems. Accordingly, for the first subsystem and the one or more subsystems other than the first subsystem in the plurality of subsystems, the hardware resources of the computing device can be divided by hardware isolation. Accordingly, the first subsystem having the trusted computing platform constructed thereon can be isolated from the computing environment of other subsystems, forming a relatively closed environment to ensure the independence and security of the trusted computing platform. In addition, by setting the priorities, the first subsystem performing the measurement can be given access to access resources of the subsystem being measured.

In the security management method provided by the embodiments of the present disclosure, for the security architecture system including the secure element subsystem, the first subsystem arranged with the trusted computing platform can be used to actively measure the security of some or all of the remaining subsystems to ensure the security of the running objects to provide a secure and reliable computing environment, and avoid risks such as leakage of important information. In the security architecture system with the secure element subsystem, the trusted computing technology is further implemented, which can further improve the security of the computing environment on the basis of the protection of the security chip technology. Accordingly, the safety and reliability of the computing system are jointly improved by using the trusted computing technology and the security chip technology. This is beneficial to enable the computing device with the security architecture system to be used to implement application scenarios with higher security requirements, and the security business scope of the computing device is increased.

It should be understood that the security management method according to some embodiments of the present disclosure can be applied to the security architecture system according to some embodiments of the present disclosure described above in conjunction with the accompanying drawings, and can achieve similar functions and technical effects. Based on this, the specific processes implemented by the security management method according to some embodiments of the present disclosure will not be described again.

Another aspect of the present disclosure further provides a computing device. FIG. 7 is a schematic block diagram of a computing device 1000 according to some embodiments of the present disclosure. The computing device 1000 according to some embodiments of the present disclosure may be arranged with a security architecture system 1010 as described above. For the specific form and the implemented functions of the security architecture system arranged in the computing device 1000, reference can be made to the relevant description above, which will not be repeated here.

By using the computing device including the security architecture system provided by the embodiments of the present disclosure, the data security can be improved based on a trusted computing platform, access operations with security risks can be avoided, and security risks such as leakage of important information can also be avoided. Further, improving the security of the computing device is beneficial to enriching the application scenarios of the device. For example, programs with high security requirements can also be installed in personal mobile phones and the corresponding functions can be implemented to ensure user information security and help build a safe and reliable environment for product usage.

Figure 8:
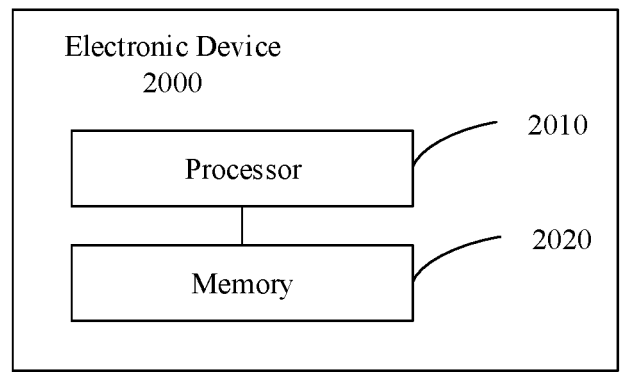
FIG. 8 is a schematic diagram of an electronic device implementing the security management method according to some embodiments of the present disclosure.

FIG. 8 is a schematic diagram of an electronic device 2000 implementing the security management method according to some embodiments of the present disclosure. As shown in FIG. 8, the electronic device 2000 may be configured with a processor 2010 and a memory 2020. Computer readable codes may be stored in the memory 2020. The computer readable codes, when executed by the processor 2010, may cause the processor to implement the security management method according to some embodiments of the present disclosure. Alternatively, the processor 2010 may also implement some or all of the functions implemented by the trusted platform control module described above. For example, the security architecture system as shown in FGI. 4 to FIG. 5B may be arranged in the electronic device 2000, and the security management method according to some embodiments of the present disclosure may be implemented through the security architecture system described above.

The processor 2010 may perform various actions and processes according to a program stored in the memory 2020. Specifically, the processor 2010 may be an integrated circuit chip with signal processing capabilities. The processor may be a general-purpose processor, a digital signal processor (DSP), an application specific integrated circuit (ASIC), a ready-made programmable gate array (FPGA) or other programmable logic devices, a discrete gate or a transistor logic device, and a discrete hardware component. The general-purpose processor may be a microprocessor, or the processor may also be any conventional processor, etc., and can be X86 architecture or ARM architecture, etc. The processor 2010 may be configured to implement or execute various methods, steps and logic block diagrams disclosed in the embodiments of the present disclosure.

Memory 2020 can store computer executable instruction codes which are used to implement the security management method according to the embodiments of the present disclosure when executed by the processor 2010. The memory 2020 may be a volatile memory or a nonvolatile memory or may include both volatile memory and nonvolatile memory. Nonvolatile memory may be read-only memory (ROM), programmable read-only memory (PROM), erasable programmable read-only memory (EPROM), electrically erasable programmable read-only memory (EEPROM), or flash memory. The volatile memory may be a random-access memory (RAM), which is used as an external cache. Many forms of RAMs are available, such as static random-access memory (SRAM), dynamic random-access memory (DRAM), synchronous dynamic random access memory (SDRAM), double data rate synchronous dynamic random access memory (DDRSDRAM), enhanced synchronous dynamic random access memory (ESDRAM), synchronously connected dynamic random access memory (SLDRAM) and direct memory bus random access memory (DR RAM). It should be noted that the memory of the method described herein is intended to include, but not be limited to, these and any other suitable types of memories.

Figure 9:
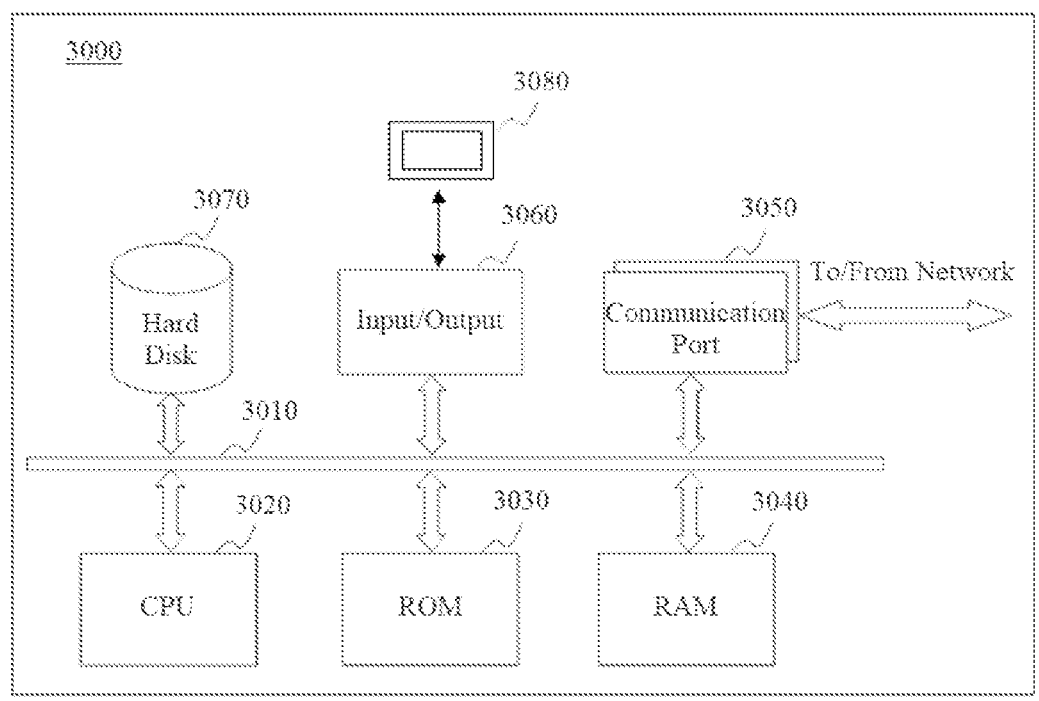
FIG. 9 is a schematic diagram of an electronic device architecture according to some embodiments of the present disclosure.

The security architecture system or security management method according to the embodiments of the present disclosure may also be implemented by means of the architecture of a computing device 3000 shown in FIG. 9. As shown in FIG. 9, the computing device 3000 may include bus 3010, one or more CPUs 3020, read-only memory (ROM) 3030, random access memory (RAM) 3040, communication port 3050 connected to the network, input/output component 3060, hard disk 3070, etc. The storage device in the computing device 3000, such as ROM 3030 or hard disk 3070, may store various data or files used for processing and/or communication of the security management method provided by the present disclosure, as well as program instructions executed by the CPU. The computing device 3000 may also include a user interface 3080.

Of course, the architecture shown in FIG. 9 is only exemplary, when implementing different devices, one or more components of the computing device shown in FIG. 11 may be omitted according to system requirements. For example, the computing device 3000 described above may be implemented as a mobile terminal installed with an application program, and the security architecture system according to the embodiments of the present disclosure may be implemented in the mobile terminal to realize the corresponding functions.

Figure 10:
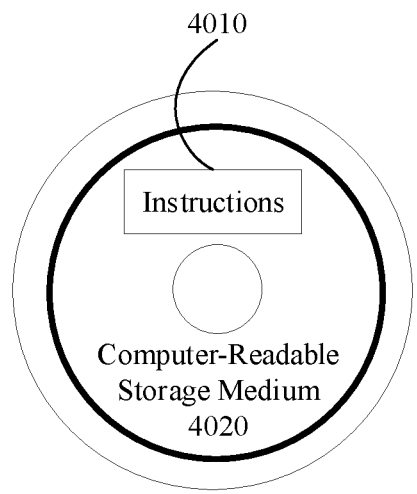
FIG. 10 is a schematic diagram of a non-transitory computer-readable storage medium according to some embodiments of the present disclosure.

Another aspect of the present disclosure further provides a non-transitory computer-readable storage medium. FIG. 10 is a schematic diagram of a non-transitory computer-readable storage medium 4020 according to some embodiments of the present disclosure.

As shown in FIG. 10, instructions, such as computer-readable instructions 4010 can be stored in the non-transitory computer-readable storage medium 4020. The computer-readable instructions 4010, when executed by a processor, can perform the security management method described in the foregoing embodiments. The computer-readable storage medium may include, but is not limited to, volatile memory and/or non-volatile memory. The volatile memory may include random-access memory (RAM) and/or cache memory, etc., and the non-volatile memory may include read-only memory (ROM), hard disk, flash memory, etc. In some embodiments, the computer-readable storage medium 4020 may be connected to a computing device such as a computer, and then, with the computing device running the computer-readable instructions 4010 stored on the computer-readable storage medium 4020, the security management method described above can be performed.

Another aspect of the present disclosure further provides a computer program product or a computer program. The computer program product or the computer program includes computer-readable instructions stored in a computer-readable storage medium. The processor of the computer device can read the computer-readable instructions from the computer-readable storage medium, and the processor can execute the computer-readable instructions, such that the computer device can execute the security management method described in the foregoing embodiments.

In the security architecture system, the security management method and the computing device provided by the embodiments of the present disclosure, for the security architecture system including the secure element subsystem, the first subsystem arranged with the trusted computing platform can be used to actively measure the security of some or all of the remaining subsystems to ensure the security of the running objects to provide a secure and reliable computing environment, and avoid risks such as leakage of important information. In the security architecture system with the secure element subsystem, the trusted computing technology is further implemented, which can further improve the security of the computing environment on the basis of the protection of the security chip technology. Accordingly, the safety and reliability of the computing system are jointly improved by using the trusted computing technology and the security chip technology. This is beneficial to enable the computing device with the security architecture system to be used to implement application scenarios with higher security requirements, and the security business scope of the computing device is increased.

Those skilled in the art can understand that the content disclosed in the present disclosure can have various modifications and improvements. For example, the various devices or components described above can be implemented by hardware, or can be implemented by software, firmware, or a combination of some or all of them.

Furthermore, although the present disclosure makes various references to certain units in the system according to the embodiments of the present disclosure, any number of different units can be used and run on the client and/or server. The unit is merely illustrative and different units can be used for different aspects of the system and method.

Flowcharts are used in the present disclosure to illustrate the steps of methods provided by the embodiments of the present disclosure. It is to be expressly understood that, the preceding or following steps may or may not be implemented in exact order. Conversely, the steps may be performed in inverted order, or simultaneously. In addition, one or more other steps may be added to the flowcharts.

Those of ordinary skill in the art can understand that all or part of the steps in the above method can be completed by instructing relevant hardware through a program, and the program can be stored in a computer-readable storage medium, such as a read-only memory, a magnetic disk, or an optical disk, etc. Optionally, all or part of the steps of the foregoing embodiments can also be implemented using one or more integrated circuits. Accordingly, each module/unit in the foregoing embodiments can be implemented in the form of hardware or can be implemented in the form of software functional modules. The present disclosure is not limited to the combination of hardware and software in any particular form.

Unless defined otherwise, all terms (including technical and scientific terms) used here have the same meaning as those commonly understood by those of ordinary skill in the art to which this disclosure belongs. It should also be understood that terms such as those defined in ordinary dictionaries should be interpreted as having meanings which are consistent with their meanings in the context of the relevant technology and should not be interpreted in ideal or extremely formal meanings, unless explicitly defined as such here.

The above is an illustration of the present disclosure and should not be considered as a limitation thereof. Although several exemplary embodiments of the present disclosure are described, it will be easy for those skilled in the art to understand that many modifications can be made to the exemplary embodiments without departing from the novel teaching and advantages of the present disclosure. Therefore, all these modifications are intended to be included in the scope of the present disclosure as defined in the claims. It should be understood that the above is an illustration of the present disclosure and should not be considered as being limited to the particular embodiments disclosed, and modifications to the disclosed embodiments and other embodiments are intended to be included in the scope of the appended claims. The present disclosure is limited by the claims and their equivalents.

What is claimed is:

1. A security architecture system comprising:
a plurality of subsystems, the plurality of subsystems including a secure element (SE) subsystem, a first subsystem of the plurality of subsystems being constructed with a trusted computing platform, the trusted computing platform including a trusted platform control module, wherein:
the first subsystem is configured to, for a running object in one or more subsystems other than the first subsystem in the plurality of subsystems, use the trusted platform control module to perform security measurement on the running object based on a measurement strategy and a measurement benchmark value to obtain a measurement result, the measurement result being used to control a running state of the running object in the one or more subsystems other than the first subsystem in the plurality of subsystems.

2. The security architecture system of claim 1, wherein:
the first subsystem is a trusted execution environment (TEE) subsystem, and
the trusted platform control module in the TEE subsystem is constructed by:
running a trusted platform control module service layer on an operating system of the TEE subsystem; and
running a trusted software base on the trusted platform control module service layer, the trusted software base being configured to perform the security measurement.

3. The security architecture system of claim 1, wherein:
the first subsystem is the SE subsystem, and
the trusted platform control module in the SE subsystem is constructed by running a trusted software base in a firmware of the SE subsystem, the trusted software base being configured to perform the security measurement.

4. The security architecture system of claim 2, wherein:
one of more subsystems of the plurality of subsystems other than the first subsystem includes a rich execution environment (REE) subsystem; and
the trusted computing platform further includes a proxy module, the proxy module being constructed in the REE subsystem, and configured to obtain information associated with the security measurement of the running object in the REE subsystem, provide the information to the trusted platform control module through a shared memory, and control the running state of the running object.

5. The security architecture system of claim 3, wherein:
one of more subsystems of the plurality of subsystems other than the first subsystem includes the REE subsystem and the TEE subsystem;
the running object in the REE subsystem is a first running object, and the running object in the TEE subsystem is a second running object; and
the trusted computing platform further includes a first proxy module and a second proxy module, wherein:
the first proxy module is constructed in the REE subsystem, and configured to obtain first information associated with the security measurement of the first running object, provide the first information to the trusted platform control module through the shared memory, and control the running state of the first running object, and
the second proxy module is constructed in the TEE subsystem, and configured to obtain second information associated with the security measurement of the first running object, provide the second information to the trusted platform control module through the shared memory, and control the running state of the second running object.

6. The security architecture system of claim 1, wherein:
a hardware isolation is established between the first subsystem and one or more subsystems other than the first subsystem in the plurality of subsystems, and an access priority of the first subsystem is higher than the access priority of the one or more subsystems other than the first subsystem in the plurality of subsystems.

7. The security architecture system of claim 2, wherein controlling the running state of the running object in one or more subsystems other than the first subsystem in the plurality of subsystems includes:
   suspending or terminating the running object in response to the measurement result not meeting an expected condition.

8. A security management method suitable for a security architecture system that includes a plurality of subsystems, the method comprising:
   for a running object in one or more subsystems other than a first subsystem in the plurality of subsystems, using a trusted platform control module to perform security measurement on the running objects based on a measurement strategy and a measurement benchmark value to obtain a measurement result; and
   controlling, based on the measurement result, a running state of the running object in the one or more subsystems other than the first subsystem in the plurality of subsystems,
   wherein: the plurality of subsystems include a secure element (SE) subsystem; and the trusted platform control module is included in a trusted computing platform of the first subsystem.

9. The security management method of claim 8, wherein:
   the first subsystem is a trusted execution environment (TEE) subsystem, and
   the trusted platform control module in the TEE subsystem is constructed by:
      running a trusted platform control module service layer on an operating system of the TEE subsystem; and
      running a trusted software base on the trusted platform control module service layer, the trusted software base being configured to perform the security measurement.

10. The security management method of claim 8, wherein:
    the first subsystem is the SE subsystem, and
    the trusted platform control module in the SE subsystem is constructed by running a trusted software base in a firmware of the SE subsystem, the trusted software base being configured to perform the security measurement.

11. The security management method of claim 9, wherein:
    one of more subsystems of the plurality of subsystems other than the first subsystem includes a rich execution environment (REE) subsystem; and
    the trusted computing platform further includes a proxy module, the proxy module being constructed in the REE subsystem, and configured to obtain information associated with the security measurement of the running object in the REE subsystem, provide the information to the trusted platform control module through a shared memory, and control the running state of the running object.

12. The security management method of claim 10, wherein:
    one of more subsystems of the plurality of subsystems other than the first subsystem includes the REE subsystem and the TEE subsystem;
    the running object in the REE subsystem is a first running object, and the running object in the TEE subsystem is a second running object; and
    the trusted computing platform further includes a first proxy module and a second proxy module, wherein:

the first proxy module is constructed in the REE subsystem, and configured to obtain first information associated with the security measurement of the first running object, provide the first information to the trusted platform control module through the shared memory, and control the running state of the first running object, and
the second proxy module is constructed in the TEE subsystem, and configured to obtain second information associated with the security measurement of the first running object, provide the second information to the trusted platform control module through the shared memory, and control the running state of the second running object.

13. The security management method of claim 8, wherein:
    a hardware isolation is established between the first subsystem and one or more subsystems other than the first subsystem in the plurality of subsystems, and an access priority of the first subsystem is higher than the access priority of the one or more subsystems other than the first subsystem in the plurality of subsystems.

14. The security management method of claim 9, wherein controlling the running state of the running object in one or more subsystems other than the first subsystem in the plurality of subsystems includes:
    suspending or terminating the running object in response to the measurement result not meeting an expected condition.

15. A computing device comprising:
    a security architecture system, the security architecture system including:
    a plurality of subsystems, the plurality of subsystems including a secure element (SE) subsystem, a first subsystem of the plurality of subsystems being constructed with a trusted computing platform, the trusted computing platform including a trusted platform control module, wherein:
    the first subsystem is configured to, for a running object in one or more subsystems other than the first subsystem in the plurality of subsystems, use the trusted platform control module to perform security measurement on the running object based on a measurement strategy and a measurement benchmark value to obtain a measurement result, the measurement result being used to control a running state of the running object in the one or more subsystems other than the first subsystem in the plurality of subsystems.

16. The computing device of claim 15, wherein:
    the first subsystem is a trusted execution environment (TEE) subsystem, and
    the trusted platform control module in the TEE subsystem is constructed by:
       running a trusted platform control module service layer on an operating system of the TEE subsystem; and
       running a trusted software base on the trusted platform control module service layer, the trusted software base being configured to perform the security measurement.

17. The computing device of claim 15, wherein:
    the first subsystem is the SE subsystem, and
    the trusted platform control module in the SE subsystem is constructed by running a trusted software base in a firmware of the SE subsystem, the trusted software base being configured to perform the security measurement.

18. The computing device of claim 16, wherein:
one of more subsystems of the plurality of subsystems other than the first subsystem includes a rich execution environment (REE) subsystem; and
the trusted computing platform further includes a proxy module, the proxy module being constructed in the REE subsystem, and configured to obtain information associated with the security measurement of the running object in the REE subsystem, provide the information to the trusted platform control module through a shared memory, and control the running state of the running object.

19. The computing device of claim 17, wherein:
one of more subsystems of the plurality of subsystems other than the first subsystem includes the REE subsystem and the TEE subsystem;
the running object in the REE subsystem is a first running object, and the running object in the TEE subsystem is a second running object; and
the trusted computing platform further includes a first proxy module and a second proxy module, wherein:
the first proxy module is constructed in the REE subsystem, and configured to obtain first information associated with the security measurement of the first running object, provide the first information to the trusted platform control module through the shared memory, and control the running state of the first running object, and
the second proxy module is constructed in the TEE subsystem, and configured to obtain second information associated with the security measurement of the first running object, provide the second information to the trusted platform control module through the shared memory, and control the running state of the second running object.

20. The computing device of claim 15, wherein:
a hardware isolation is established between the first subsystem and one or more subsystems other than the first subsystem in the plurality of subsystems, and an access priority of the first subsystem is higher than the access priority of the one or more subsystems other than the first subsystem in the plurality of subsystems.

* * * * *